UNITED STATES PATENT OFFICE.

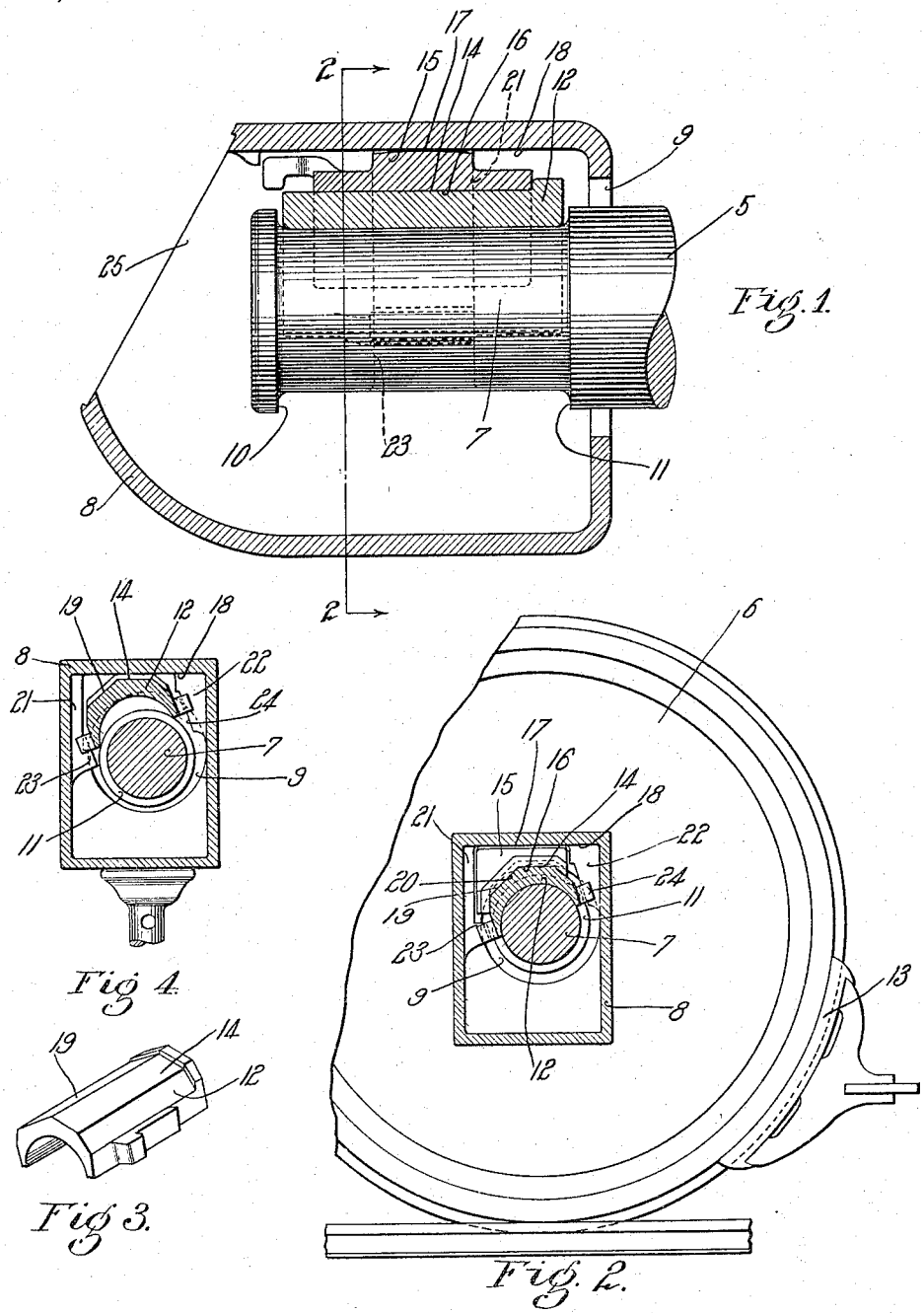

GEORGE F. STARBUCK, OF WALTHAM, MASSACHUSETTS.

JOURNAL-BOX.

1,168,759.　　　　Specification of Letters Patent.　　Patented Jan. 18, 1916.

Application filed March 31, 1915. Serial No. 18,255.

*To all whom it may concern:*

Be it known that I, GEORGE F. STARBUCK, a citizen of the United States, residing at Waltham, in the county of Middlesex and State of Massachusetts, have invented new and useful Improvements in Journal-Boxes, of which the following is a specification.

This invention relates to improvements in journal boxes and has for its object to provide a journal box having a bearing which is adapted to be positioned within said journal box in contact with the journal projecting into said journal box and in opposed relation to the brake shoe engaging the periphery of the wheel or wheels secured to the shaft of which said journal forms a part. In other words the bearing, or sometimes called, the "brass" is adapted to contact with substantially one-half of the periphery of the journal and said bearing is tipped at an angle to a vertical plane containing the axis of said journal so as to bring the major portion of the journal contacting surface thereof at one side of said vertical plane or upon the opposite side thereof from said brake shoe. By reason of such an arrangement of the journal bearing on said journal the thrust upon said bearing, due to the application of the brakes will not be borne by the thin edge portion of said bearing, but will be uniformly distributed substantially throughout the contacting portions of said bearing with said journal.

Another object of the invention is to provide a journal bearing key which is constructed and arranged to surmount said journal bearing and lock the same in place within said journal box, the major portion of said key being disposed at one side of the vertical plane passing through the axis of said journal. The journal bearing and journal key are provided with coöperating surfaces preferably arranged substantially at right angles to said vertical plane, which surfaces receive substantially the entire weight of the car body. Said journal bearing and said journal key are also preferably provided with coöperating inclined faces adapted to receive the thrust from said journal, resulting from the application of the brakes to the wheels of the vehicle.

The invention consists in the combination and arrangement of parts set forth in the following specification and particularly pointed out in the claims.

Referring to the drawings: Figure 1 is a vertical section, partly in elevation, through a journal box embodying my invention. Fig. 2 is a section taken substantially on the line 2—2 of Fig. 1 illustrating portions of a wheel and brake shoe in contact with the periphery thereof. Fig. 3 is a detail perspective view of the journal bearing. Fig. 4 is a section similar to Fig. 2 with the wheel and brake shoe omitted. This figure illustrates the journal box jacked up, the key removed and the bearing elevated sufficient to be withdrawn from the journal box.

Like numerals refer to like parts throughout the several views of the drawings.

In the drawings, 5 is an axle; 6 a wheel mounted on said axle and 7 one of the journals of said axle. A journal box 8 of the usual and well known construction incloses the journal 7, which journal projects into said journal box through an opening 9 at the rear thereof. The journal 7 has shoulders 10 and 11 at the outer and inner ends respectively of said journal which are adapted to engage opposite ends of a journal bearing 12 mounted upon said journal 7.

It is customary for journal bearings to extend and contact with less than one-half of the periphery of the journal and that portion engaged by said bearing is usually symmetrically disposed relatively to a vertical plane containing the axis of the journal.

When the journal bearings are arranged as just described, the side of said bearing which is opposed to the brake shoe engaging the periphery of the wheel is much more rapidly worn away by the pressure resulting from the application of the brakes and when such wear develops, the journal bearing will be permitted to rock and cause more or less movement to take place between the journal and the journal box.

13 is a brake shoe and is arranged in the usual position.

It will be evident by referring to Fig. 2 that when the brake is applied to the wheel the greatest pressure will be applied to the journal bearing upon the opposite side of the axis of the journal 7 from said brake shoe. Therefore to more uniformly distribute the thrust from said brake about the contacting surface of said bearing with said journal, said bearing 12 has been tipped or arranged in opposed relation to said brake with the major portion of the journal contacting surface of said bearing disposed at one side of a vertical plane containing the axis of said journal. The side of said plane referred to is that opposite to the side upon which said brake shoe is arranged.

To insure the proper positioning of said bearing within the position referred to, said bearing has been provided with a supporting surface 14 arranged preferably at right angles to said vertical plane and substantially symmetrical relatively thereto. A journal bearing key 15 surmounts said journal bearing and is provided with a surface 16 to correspond with the supporting surface 14. The upper surface 17 of the key 15 is arranged substantially parallel with the surfaces 14 and 16 and engages the under face 18 of the upper wall of the journal box. The surfaces 14 and 16 are arranged very nearly symmetrical relatively to the vertical plane containing the axis of the journal 7, thus the weight of the car borne by the journal 7 will rest squarely upon said journal.

The journal bearing 12 is provided with another flat surface 19 substantially equal in area to the surface 14 and inclined at an angle equal to the angle of the surface 14 relatively to a plane extending longitudinally of said bearing and centrally thereof. The surface 19 engages a corresponding surface 20 upon the key 15, said last named surface being adapted to receive the thrust imparted to said bearing by the application of the brake to the wheel. The key 15 is adapted to fit between vertically disposed guides 21 and 22 formed within the journal box 8 and is maintained by said guides in the desired position, thus positioning said bearing at the desired inclination relatively to said journal.

The journal box 8 is also provided with guides 23 and 24 which are continuations of the guides 21 and 22, but inclined at an angle thereto. These guides 23 and 24 are arranged parallel with the center line of the journal bearing 12, when in its inclined position, and are adapted to guide said journal bearing radially relatively to the axis of the journal 7 when said bearing is being removed or inserted.

When it is desired to remove the bearing from the journal box, the journal box is slightly raised by means of a jack, as shown in Fig. 4, removing the weight of the car body from the key 15 which may then be easily withdrawn. The journal bearing 12 is then moved radially relatively to the axis of the journal 7 along the guides 24 until the lower extremities of said bearing are clear of the shoulder 10 at the end of said journal, whereupon said journal bearing may be withdrawn longitudinally of said journal through the opening 25 in the front of said journal box.

Having thus described my invention what I claim and desire by Letters Patent to secure is:

1. In combination, an axle, a wheel attached to said axle, a brake shoe adapted to engage a portion of the periphery of said wheel, and a journal bearing arranged against said axle in opposed relation to said brake shoe.

2. In combination, an axle, a wheel attached to said axle, a brake shoe adapted to engage a portion of the periphery of said wheel, a journal bearing arranged against said axle in opposed relation to said brake shoe, a journal box constructed and arranged to contain said journal bearing, and means within said journal box adapted to guide said journal bearing radially relatively to the axis of said shaft and at an angle to a vertical plane containing said axis.

3. In combination, a journal box, a journal arranged within said box, a wheel coaxially disposed with said journal, a brake shoe adapted to engage a portion of the periphery of said wheel, a journal bearing mounted upon said journal with the major portion of the journal contacting surface of said bearing disposed upon the opposite side of a vertical plane containing the axis of said journal, with respect to said brake shoe and constructed and arranged to oppose said brake shoe, said journal bearing having a supporting surface arranged at right angles to said vertical plane, and a journal bearing key surmounting said journal bearing in contact with said supporting surface.

4. In combination, a journal box, a journal arranged in said box, a wheel coaxially disposed with said journal, a brake shoe adapted to engage a portion of the periphery of said wheel, a journal bearing arranged upon said journal at a substantial angle to a vertical plane containing the axis of said journal, said journal bearing being arranged upon the opposite side of said vertical plane with respect to said brake shoe and constructed and arranged to oppose pressure from said shoe, and a key constructed and arranged to position said bearing at said angle relatively to said journal.

5. In combination, a journal box, a journal arranged in said box, a wheel coaxially disposed with said journal, a brake shoe constructed and arranged to engage the periphery of said wheel, a journal bearing mounted upon said journal at a substantial angle to a vertical plane containing the axis of said journal, in opposed relation to said brake shoe and constructed and arranged to substantially directly oppose the pressure applied to said wheel by said brake shoe during the application of the brakes, guides disposed upon opposite sides of said journal and arranged substantially parallel with the central axial plane of said bearing, said guides being constructed and arranged to engage and guide said bearing within said journal box obliquely with respect to said vertical plane, a key interposed between said bearing and said journal box, and guides arranged substantially parallel with a vertical plane containing the axis of said journal, said guides adapted to prevent a lateral movement of said journal box relatively to said journal.

6. In combination, a journal box, a journal arranged within said box, a wheel coaxially disposed with respect to said journal, a brake shoe constructed and arranged to engage the portion of the periphery of said wheel at one side of a vertical plane containing the axis of said journal, a journal bearing mounted upon said journal with the major portion of the journal contacting surface of said bearing disposed at one side of said vertical plane, said journal bearing having a supporting surface arranged at right angles to said vertical plane and substantially symmetrically disposed relatively to said plane, a removable journal bearing key surmounting said journal bearing in contact with said supporting surface, vertically disposed guides on said journal box adapted to engage said key, a second pair of guides on said journal box disposed obliquely to said vertically disposed guides, and means on said bearing adapted to engage said obliquely disposed guides to guide said bearing when said key is removed.

In testimony whereof I have hereunto set my hand in presence of the subscribing witness.

GEORGE F. STARBUCK.

Witness:
SYDNEY E. TAFT.

Copies of this patent may be obtained for five cents each, by addressing the "Commissioner of Patents, Washington, D. C."